United States Patent [19]
Conklin

[11] 3,804,617
[45] Apr. 16, 1974

[54] PROCESS FOR BUILDING MOLDS TO PRODUCE PILE MATERIALS

[75] Inventor: Robert M. Conklin, Scarsdale, N.Y.

[73] Assignee: Brunswick Corporation, Skokie, Ill.

[22] Filed: Jan. 5, 1972

[21] Appl. No.: 215,556

[52] U.S. Cl................. 75/208 R, 29/182.3, 29/420, 29/DIG. 31, 75/200, 156/155, 156/296
[51] Int. Cl............................................. B22f 7/08
[58] Field of Search ............ 156/72, 146, 155, 296; 29/420, 423, 182.3, 182.2; 75/208 R, 200

[56] References Cited
UNITED STATES PATENTS

| | | | |
|---|---|---|---|
| 3,506,885 | 4/1970 | Roberts et al. | 317/230 |
| 2,996,419 | 8/1961 | Schmick | 156/296 |
| 3,616,022 | 10/1971 | Withers | 156/296 |
| 3,650,870 | 3/1972 | Dietzsch | 156/296 |
| 3,666,583 | 5/1972 | Pei | 156/296 |
| 3,222,144 | 12/1965 | Davenport | 29/191 |
| 2,628,417 | 2/1953 | Peyches | 29/148 |

Primary Examiner—Daniel J. Fritsch

[57] ABSTRACT

A process for building a pile making mold by bonding a plurality of tubes or needles into a matrix, as well as the mold, are disclosed. The use of tubes to make a mold permits the selection of a wider variety mold and pile dimensions than can be obtained with conventional methods of forming cavities in a mold surface. A pile material made by this process is also described.

6 Claims, 7 Drawing Figures

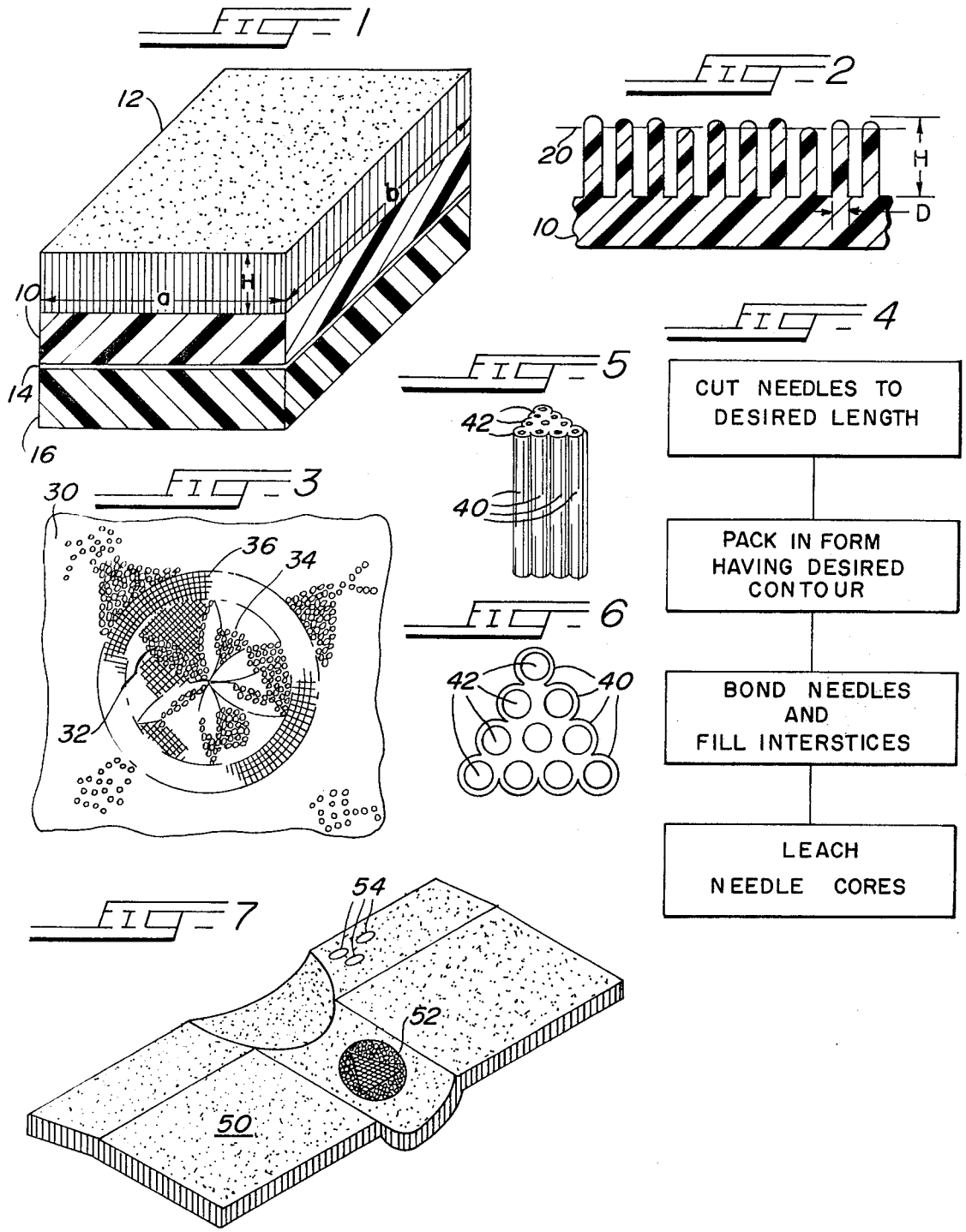

3,804,617

PROCESS FOR BUILDING MOLDS TO PRODUCE PILE MATERIALS

BACKGROUND OF INVENTION

1. Field of Invention

This invention is a process for building a mold for making pile materials and more particularly is a process in which a novel mold is made which can be used to produce highly desirable molded piles such as those having the texture and appearance of pile materials made by conventional textile processes. The invention also includes the novel molds made by the novel process.

2. Description of The Prior Art

Descriptions of the limitations of prior art pile molds and piles as well as the processes for making them appear in the commonly owned co-pending patent applications of Tompkins and Moore entitled Molded Pile, filed Jan. 5, 1972, Ser. No. 215,623 and Roberts and Acciavatti entitled Process For Making Pile Materials and Pile Materials Produced Therefrom, filed Jan. 5, 1972, Ser. No. 215,557, now abandoned. For the reasons noted in the patent applications, the basic deficiency found in the prior art is that the characteristics of the product are dictated by the limitations of the production process and not by customer taste.

As described by Tompkins and Moore, currently available molded pile products lack the right combination of:

fiber diameter
fiber height; and
fiber density to provide the texture and appearance desired by customers in a carpet-like material. One reason found by Tompkins and Moore for the failure to develop satisfactory materials is the attention paid by previous workers to raising the limitations imposed by existing mold techniques instead of inventing new types of molds and processes for making molds.

Prior art references, such as those cited in the Tompkins and Moore application, describe processes in which the matrix or die used to form the pile comprises a surface having a large number of cavities which have been formed by steps such as drilling, punching, puncturing, pressing, etching, engraving, embossing, and burning. While the results differ, they do prove that there is a finite limit to the resolution which can be achieved by using any of these methods to form relatively deep holes or cavities in mold surfaces made from steel and the like. As Tompkins and Moore have shown, the resolution (density) and aspect ratio (depth ÷ diameter) of pile cavities are well below that needed to produce desirable products.

The best example of the limitations of the prior art molded piles appears in the following U.S. Pat. Nos. which issued to Takai, et al.:

| | |
|---|---|
| 3,027,595 | 3 APR 62 |
| 3,141,051 | 14 JUL 64 |
| 3,317,633 | 2 MAY 67 |

In FIG. 6 of this Patent No. 3,141,051, Takai illustrates how he makes a mold (called embossing roll 27) by repeatedly piercing the surface of a lead alloy drum with sharpened piano wires. While he teaches that he can make 15,000–25,000 punctures per square inch by this method, the pile products he describes as examples fail to meet the combination of characteristics found by Tompkins and Moore to be most desirable for covering architectural surfaces such as floors and walls; that is, piles which have fibers that are:

½ to 12 mils in diameter at their bases
5:1 or greater in aspect ratio; and
10 to 25 dense at the wearing surface.

The reason that Takai cannot achieve these results seems to be an inherent limitation in his mold making method - namely, piano wires of the required diameter are not capable of withstanding the compressive loads required to push them any substantial distance into a metal.

Recognizing the limitations of the practices taught by Takai and others who sought to improve the state of the art, Roberts and Acciavatti invented a new process for making molded pile which as described in their above-referenced application, is characterized by providing a mold made by binding a plurality of longitudinal elements into a matrix instead of providing a mold made by piercing or drilling holes into a metal surface, Roberts and Acciavatti prepared their first mold by bundling a plurality of rods sheathed in tubes into a can and then drawing the can through a series of wire dies until the rods reached a fine diameter and the tubes were integrated into a unified mechanical structure. The rods then dissolved chemically and the resulting mold matrix then comprised a solid structure having a large number of collimated holes or cavities. Such collimated hole structures are of the type sold by Brunswick Corporation of Skokie, Illinois under the trademark CHS. The collimated hole structures and processes for their manufacture are generally taught in the following U.S. Patents to Roberts, et al:

| | |
|---|---|
| 3,482,703 | 9 DEC 69 |
| 3,506,885 | 14 APR 71 |

While the specific Roberts-Acciavatti molds are useful individually, they are, as a practical matter, restricted in size to a few square inches because of the limitations of the wire drawing art, such as maximum die size and drawing force. Although individual collimated hole structures can be joined together to make larger pieces, the cost becomes prohibitive when large molds, as for room-size carpets are made from segments the size of half-dollar coins. Further, the seams between each of these coin-sized segments cause corresponding lines in the molded pile which can ruin its appearance.

Accordingly, a principal object of this invention is to avoid the limitations imposed on the Roberts-Acciavatti process by the wire drawing art and seaming methods and to provide an improved process for building large pile molds which in turn will produce plush, textile-like materials such as those described above. This, as well as other objects, features and advantages of this invention are more fully described in conjunction with the drawing in which:

FIG. 1 is a perspective view of one type of molded pile made according to the Roberts-Acciavatti invention;

FIG. 2 is a magnified cross-sectional view of the pile of FIG. 1;

FIG. 3 is a top plan view of a variation of the molded pile of FIG. 1 in which the pile fibers having different cross-sections coordinate to form a pattern;

FIG. 4 is a chart showing the major steps in the process of this invention used to make the needle mold depicted in FIGS. 5, 6 and 7;

FIG. 5 is a perspective view of a portion of the needle mold used to form a pile such as that shown in FIGS. 1–3;

FIG. 6 is an end view of a portion of the tube mold of FIG. 5;

FIG. 7 is a perspective view of a mold for making a pile automobile carpet.

DESCRIPTION OF A PREFERRED EMBODIMENT

The description of the process and molds of this invention must be introduced with a description of the plastic pile which is produced from these molds. A molded pile made in accordance with the process of the Roberts-Acciavatti invention is illustrated in FIGS. 1–3 of the drawing. As shown there, the molded pile comprises a backing 10 having integral, upright fibers 12. As shown in FIG. 2, the pile described here comprises fibers which are generally cylindrical, integral protrusions extending from the backing; however, they may be tapered.

In describing dimensions, the diameter of a fiber measured at its base is indicated by the dimension (D) which is measured at the fiber base approximately where the fiber becomes an integral part of the backing. Fiber height is measured from the fiber base to the fiber tip as shown by the dimension (H). The aspect ratio is defined as H/D. The density at the wearing surface is computed by calculating the percentage of surface area of a plane 20 at between 80–100 percent of the average pile height (H) which would be occupied by fiber cross-sections.

If the fibers were perfectly right cylindrical and all were the same height, the wearing surface would be at the fiber tips. In general, there is some variation in height and also in diameters near the tips due to slight differences in the rates at which the plastic backing flows into the mold. Further, surface tension can cause the fibers to taper slightly and make the tips round as shown. Thus, the wearing surface should be measured in the vicinity of 80–100 percent of the average fiber height approximately where the tapers become more pronounced.

Although the plastic material used for the backing and integral fibers may be any material which is capable of being molded or receiving form, polymers such as polyvinyl chloride, polyethylene, polypropylene and polyurethane are preferred. The backing may be homogeneous, however, some applications may require a multi-layer backing. For example, the backing shown in FIG. 1 comprises a metal screen 14 which may be bent to give the pile a permanent contour, and a sound absorption layer 16 which may be still another material.

As first taught by Tompkins and Moore, the most desirable plush surfaces are piles which have fibers that are:

½ to 12 mils in diameter at their bases
5:1 or greater in aspect ratio; and
10 to 80 percent dense at the wearing surface.

Subsequently, they found that coverings for floors, walls and other architectural surfaces could be optimized if the density of the wearing surface was within the range of 10–20 percent. Within these specifications, it has been found that floor coverings should contain pile fibers that are at least 2 ½ mils and preferably at least 5 mils in diameter at their bases while having a density in the range of 10 to 20 percent at the wearing surface. Thus, a typical molded floor covering made from a polymer would comprise pile fibers having the following characteristics:

| | |
|---|---|
| Fiber Diameter (D) | 0.008" |
| Fiber Height (H) | 0.160" |
| Fiber Aspect Ratio (H/D) | 20:1 |
| No. Fibers per in.² (N) | 3600 |
| $\pi/4 \cdot DHN$ | 3.6 |
| Fiber Density At The Wearing Surface | 18% |
| Fiber Density — Volumetric | 20% |

The volumetric fiber density is computed by calculating the percentage of pile volume ($a \cdot b \cdot H$ as shown in FIG. 1) which is actually occupied by fibers rather than air.

As shown in FIG. 3, the pile fibers may have circular cross-sections as indicated at 30, irregular cross-sections as shown at 32 or polygon cross-sections as shown at 34 and 36. By varying the cross-sections, different patterns can be suggested to the eye.

The key to making successful molded pile materials is the use of the process and molds of this invention. More specifically, the process comprises building a mold in the shape and size of the surface to be covered from a plurality of hollow needles or tubes. By using needles having selected inside and outside diameters, as well as lengths, the construction of a large mold having cavities of the requisite diameter, height or depth and density is readily accomplished without the necessity of using difficult and expensive surface piercing techniques as taught by the prior art or encountering the wire drawing or seaming limitations which sometimes can arise when using the Roberts-Acciavatti process. Further, periodic patterns are easily obtained which, in many instances, provide better texture and appearance than one can obtain with random mold cavities used in the past.

The first step in the method of making a mold is to cut needles having selected inside and outside diameters to the desired length. Preferably the needles should be hollow, cylindrical bodies of stainless steel or some other corrosionresistant material. The needles may contain releasable cores - that is, the needle cavities can be filled with a material readily released or removed to open the interior of the tubes to form the mold cavities. One example found to provide excellent results is to use stainless steel hyperdermic syringe needles having copper cores which can be released with an electrolyte such as nitric acid. Alternatively, the releasable cores may be made of a metal containing a metallic element selected from Groups I–III of the Periodic Table of the Elements. The cores can also be released either by passing an electric current from the cores through the electrolyte to an electrochemical electrode so as to plate the core material onto the electrode or by melting the core material.

The second step in the method of making the mold is to pack the needles which may have releasable cores into a form having a desired contour and perimeter or shape. The contour preferably should match that of the surface on which the pile will be used. If pile for automobile carpets is to be made, the form should match the contours and profiles of the floor of an automobile. Alternatively, the form may be cylindrical where continuous molding of pile is desired in the manner taught by Takai.

The third step in the method of making the mold is to bond the needles into a matrix. This may be done by filling the interstices between the needles with metal powder and sintering the entire mass into a unified, integral mechanical structure, portions of which are shown in FIGS. 5 and 6 wherein needles 40 contain cavities 42 filled with releasable cores.

Finally, when the needles contain cores, the cores are released from the needles 40 to from the mold cavities 42. Where the needles are stainless steel and the cores are copper, the cores can be removed by submerging the matrix in nitric acid.

The result is a mold containing cavities of specified dimensions which may be tailored to a specific application such as the needle mold 50 of FIG. 7. This needle mold has the contour of a front floor of an automobile. It permits the molding of an automobile carpet including such features as the vehicle's trademark 52 with fibers having different cross-sections and including holes 54 for the pedals. Except for the removal of gates and flashings, no other work is required for a floor carpet made with this mold to prepare it for installation.

The range of piles made with the process of this invention is very broad, as the only limitation appears to be the acquisition of needles or tubes having the desired inside and outside diameters. There are, however, a large number of needles or tubes to choose from in a wide range of metals, glass and the like. From these, it is possible to provide a mold by integrating needles having cavities with inside diameters of ½ to 12 mils and lengths at least 5 times the inside diameter into a matrix or mold whose surface is 10 to 25 percent porous into which a plastic material is flowed so that a pile meeting the specifications of Tompkins and Moore can be withdrawn.

For other applications, piles having specifications both within and outside the ranges determined by Tompkins and Moore may be desirable. These can be readily made with the process of this invention by selecting needles of various sizes. As shown by FIG. 3, molds comprising needles of various inside and outside diameters, aspect ratios, cross-sections, tapers and surface finishes produce piles having sculpture-like surfaces which add dimension to distinctive and interesting patterns. Where noncircular needles are used, the term "diameter" means the diameter of a circle having effectively the same cross-sectional area as the noncircular cross-section of the needle.

The needle molds of this invention can be used to manufacture a wide variety of products besides carpets. Needle molds and the process for building needle molds for use in manufacturing other products are also contemplated by this invention.

The embodiments of the invention in which an exclusive property or privilege is claimed are defined as follows:

1. A process for making a mold used in producing a plastic pile material comprising the steps of:
   a. providing a plurality of metal tubes having releasable solid metal cores tightly secured therein, the tubes each having a preselected length;
   b. packing the solid cored tubes into a form having a desired shape and thereby forming open interstices between the cored tubing;
   c. filling the interstices with a metal powder;
   d. sintering the tubes and the powder together to form a matrix; and,
   e. removing the releasable cores from the matrix to form a mold.

2. The process of claim 1 wherein the releasable cores are removed by electrochemical etching.

3. The process of claim 1 wherein the releasable cores are removed by a chemical etching electrolyte.

4. The process of claim 3 wherein the electrolyte is nitric acid.

5. The process of claim 1 wherein the metal tubes are stainless steel.

6. The process of claim 1 wherein the releasable cores are made of copper.

* * * * *